No. 838,824. PATENTED DEC. 18, 1906.
A. VANDERVOORT.
TIRE.
APPLICATION FILED AUG. 11, 1905.
2 SHEETS—SHEET 1.
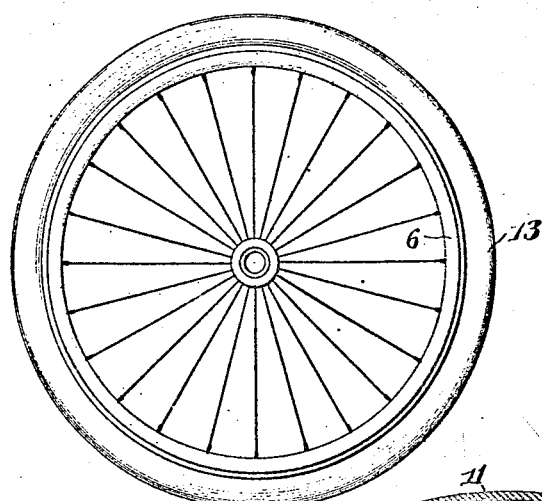
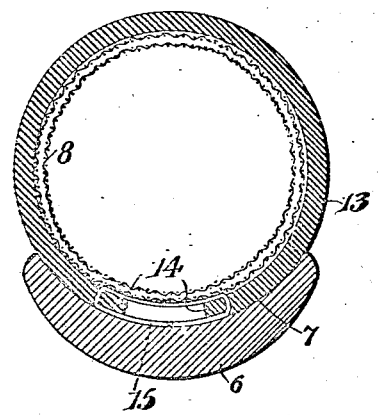
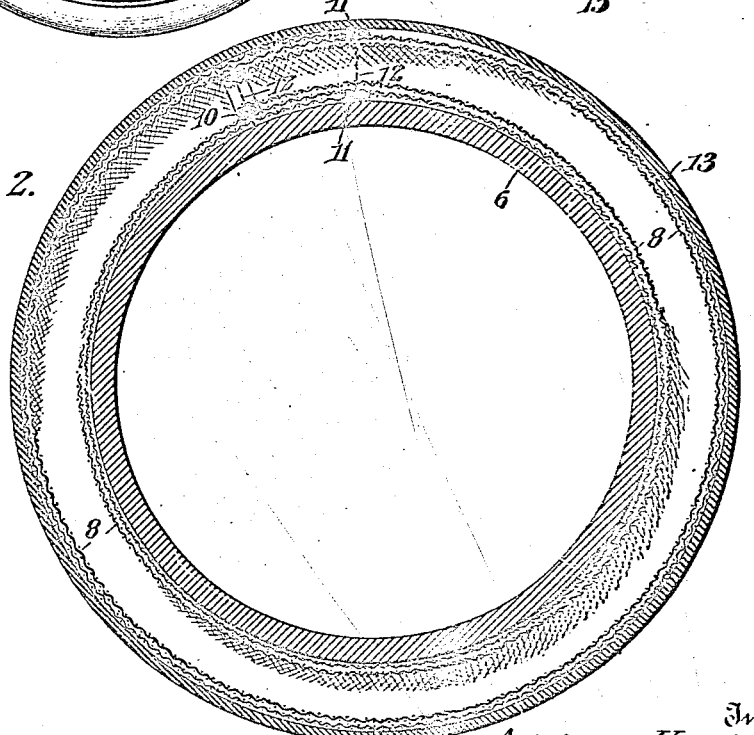
Witnesses
Jas. F. McCathran
B. J. Foster
Inventor
Addison Vandervoort
By
Attorney No. 838,824. PATENTED DEC. 18, 1906.
A. VANDERVOORT.
TIRE.
APPLICATION FILED AUG. 11, 1905.
2 SHEETS—SHEET 2.
Fig. 4.
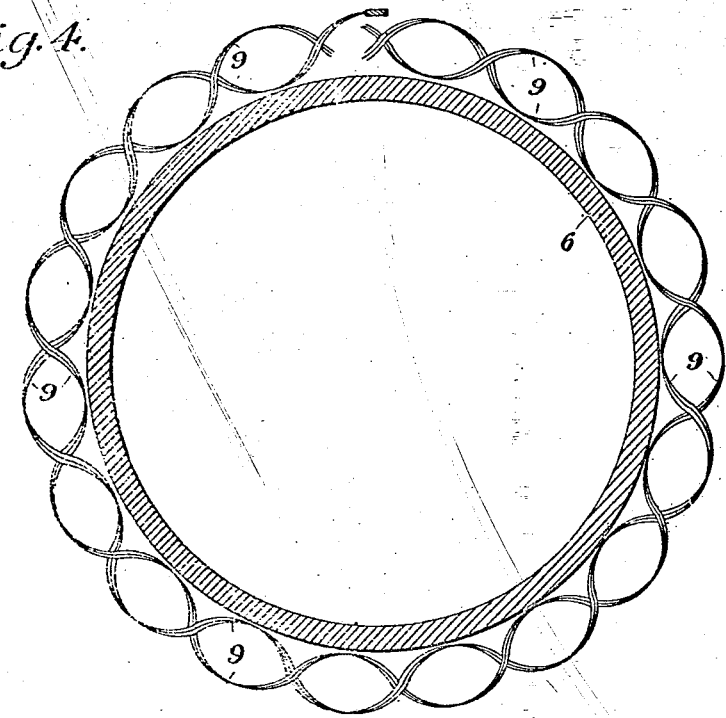
Fig. 5.
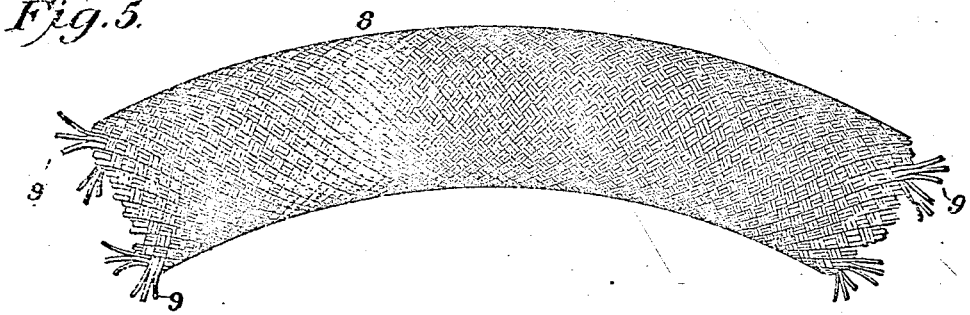
Fig. 6.
Addison Vandervoort, Inventor
Witnesses
By
Attorney

UNITED STATES PATENT OFFICE.

ADDISON VANDERVOORT, OF BELLEVILLE, ONTARIO, CANADA.

TIRE.

No. 838,824.        Specification of Letters Patent.        Patented Dec. 18, 1906.

Application filed August 11, 1906. Serial No. 273,785.

*To all whom it may concern:*

Be it known that I, ADDISON VANDERVOORT, a subject of the King of Great Britain, residing at Belleville, in the Province of Ontario and Dominion of Canada, have invented a new and useful Tire, of which the following is a specification.

This invention relates to improvements in cushion-tires for vehicles of various characters, as automobiles, bicycles, and the like.

The principal object is to provide a novel structure of a simple nature that will afford an elastic support, is not liable to collapse, and thus is not open to the objectionable features of pneumatic tires, is exceedingly durable, and can be manufactured at comparatively small cost.

An embodiment of the invention which is at present considered preferable is illustrated in the accompanying drawings, wherein—

Figure 1 is a side elevation of a wheel with the improved tire applied thereto. Fig. 2 is a vertical sectional view through the tire and rim, the same being on an enlarged scale. Fig. 3 is a cross-sectional view of the structure. Fig. 4 is a detail view showing two of the strands of the tire and illustrating the plurality of bearings of the same against the wheel-rim. Fig. 5 is a detail view of a portion of the supporting-tube, illustrating the structure thereof. Fig. 6 is a detail sectional view through a portion of the same.

Similar reference-numerals designate corresponding parts in all the figures of the drawings.

The wheel to which the improved tire may be applied can be of any desirable structure including a rim 6, having the usual annular channel 7 to receive the tire.

The principal feature of the present tire consists of a single continuous supporting-tube 8, formed without a seam and comprising oppositely-coiled strands which are interwoven—that is to say, the strands running in one direction alternately pass over and beneath the strands coiled in the opposite direction. Each of these strands is preferably made up of a plurality of resilient wires 9, laid side by side, three being shown, though the number may be varied as desired and one or more employed for each strand. It will be observed by reference to Fig. 5, showing the detail construction of the supporting-tubes, that these strands are closely interwoven, and thus each acts as a support and yielding reinforcement for the others. Two of the strands are illustrated in Fig. 4, and it will be observed by reference to said figure that each strand is continuous and because of its coiled formation has rings at intervals against the rim of the wheel. It will be apparent that by increasing the number of coils the said bearing-points can be brought closer together, affording greater rigidity to the structure. Consequently for the heavier classes of vehicles wires of comparatively heavy gage may be employed, and the coils may be formed as close as desired, whereas in lighter vehicles the reverse method will be found suitable.

While a tube of single thickness may be sufficient under certain conditions, still in order to provide the proper support a tube with several thicknesses may be employed, as illustrated in Fig. 2. This may be readily accomplished by forming the above-described seamless tube of a sufficient length and afterward elongating the portion to be inserted, thus decreasing its diameter, so that it may be introduced and readily formed into a plurality of convolutions with the ends overlapped. In order to permit the free passage of the inner end of the tube through the same, said end is preferably provided with a protecting-collar 10, of leather or other suitable material, which surrounds said end and covers the loose ends of the wires. The outer end of the tube may also be protected by a double collar 11, between which the ends of the wire are housed. Furthermore, the layers of the completed tube can be held against creeping or expansion by lines of stitching 12, passing through the said layers and the collar. While the said supporting-tube may be successfully employed without any covering, particularly when the interweaving of the strands is close enough and a comparatively fine gage of wire is employed, still a casing 13, of rubber or other usual material, may be employed, the same having a joint 14 at its inner side, which is received in the rim 6, the edges being fastened together by lines of stitching 15.

It will be apparent that this structure is very durable and is not affected by punctures. In other words, the casing can wear completely through, and for that matter the supporting-tube itself can wear without the tire collapsing. The collar 11 at the outer end of the tube serves to prevent the wires wearing the casing. The peculiar structure of the supporting-tube is important, for the strands are reinforced by each other and contribute to the mutual support of the structure as a whole, eliminating the danger of collapse and yet permitting the necessary yielding to pressure. The structure, moreover, is inexpensive, as the supporting-tube can be readily formed upon a single piece.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a vehicle cushion-tire, a single continuous resilient supporting-tube having its end portions telescoped, one within the other, and forming a plurality of thicknesses.

2. In a vehicle cushion-tire, a single continuous and seamless resilient supporting-tube having its end portions telescoped, one within the other and forming a plurality of thicknesses, said tube comprising interwoven coiled and resilient strands.

3. In a vehicle cushion-tire, a single continuous and seamless resilient supporting-tube having its end portions telescoped, one within the other, said tube comprising interwoven oppositely-coiled strands, and said strands consisting of a plurality of spring-wires laid side by side.

4. In a vehicle cushion-tire, a single resilient supporting-tube composed of woven wire, said tube being telescoped to form a plurality of thicknesses.

5. In a vehicle cushion-tire, a single resilient supporting-tube composed of woven wire having one end telescoped within the other, and a protecting-collar surrounding one of said ends.

6. In a vehicle cushion-tire, a resilient supporting-tube composed of woven wire, said tube being telescoped to form a plurality of thicknesses, a protecting-collar surrounding the outer end of the tube, and a casing covering the tube.

7. In a vehicle cushion-tire, a single resilient supporting-tube composed of oppositely-coiled interwoven strands, said tube having portions telescoped to form a plurality of thicknesses, a protecting-collar surrounding the inner end of the tube, a protecting-collar surrounding the outer end of the tube, and a casing inclosing said tube.

8. In a vehicle cushion-tire, the combination with a single seamless supporting-tube composed of oppositely-coiled interwoven strands, said strands comprising a plurality of resilient wires and said tube having portions telescoped to provide a plurality of thicknesses, of protecting-collars surrounding the inner and outer ends of the tube, and a flexible casing covering the tube and supported thereby.

In testimony that I claim the foregoing as my own I have hereto affixed my signature in the presence of two witnesses.

ADDISON VANDERVOORT.

Witnesses:
JOHN H. SIGGERS,
BLANCHE J. KALDENBACK.